United States Patent [19]

Guay

[11] Patent Number: 4,696,611
[45] Date of Patent: Sep. 29, 1987

[54] REUSABLE ANCHOR

[75] Inventor: Albert Guay, 5060 Henderson St., Los Angeles, Calif. 90032

[73] Assignee: Albert Guay, Los Angeles, Calif.

[21] Appl. No.: 852,145

[22] Filed: Apr. 15, 1986

[51] Int. Cl.4 .................. F16B 37/04; F16B 39/00
[52] U.S. Cl. ..................... 411/103; 411/349; 411/72
[58] Field of Search ............ 411/16, 17, 18, 32, 411/33, 45, 56, 71, 72, 73, 75, 76, 77, 78, 79, 80, 107, 340, 344, 349, 337, 353, 354, 398, 148, 169, 180; 74/453, 606, 607

[56] References Cited

U.S. PATENT DOCUMENTS

| 908,737 | 1/1909 | Broughton . | |
|---|---|---|---|
| 1,495,913 | 5/1924 | Lobuono | 411/75 |
| 1,785,709 | 12/1930 | Campan | 411/398 X |
| 2,691,293 | 10/1954 | Patterson . | |
| 3,272,061 | 9/1966 | Seckerson | 411/349 X |
| 3,376,779 | 4/1968 | Sol . | |
| 3,511,289 | 5/1970 | Coyle | 411/353 X |
| 3,956,803 | 5/1976 | Leitner | 411/349 |
| 4,250,681 | 2/1981 | Helderman . | |
| 4,266,591 | 5/1981 | F'Geppert . | |
| 4,372,015 | 2/1983 | Rhoton | 241/453 X |

FOREIGN PATENT DOCUMENTS

| 1025707 | 2/1978 | Canada | 411/80 |
|---|---|---|---|
| 2809583 | 9/1979 | Fed. Rep. of Germany | 411/71 |

Primary Examiner—Neill Wilson
Attorney, Agent, or Firm—Stetina and Brunda

[57] ABSTRACT

A reusable anchor is disclosed for securing a supporting base plate in place along the surface of a substrate to be drilled. The anchor comprises an anchor body having a first body portion engageable to the base plate and a second body portion extendable into the substrate to be drilled. The second body portion comprises first and second cylindrical sections. The first cylindrical section is disposed in axial alignment with the first body portion and the second cylindrical section is formed to vary between a first postion in axial alignment with respect to the first body portion and a second position eccentric with respect to said first body portion. The first and second cylindrical sections are adapted to cooperatiely engage the substrate when the second cylindrical section is disposed in the second position to maintain the anchor body in place with respect to the substrate.

10 Claims, 5 Drawing Figures

REUSABLE ANCHOR

BACKGROUND OF THE INVENTION

The present invention relates to reusable anchors to support instruments such as drills. More particularly, the present invention relates to variably eccentric anchors which may be entirely removed from the substrate upon completion of the drilling process.

A variety of different types of locking connectors have been proposed in the prior art. Where the substrate is a relatively hard material, such as concrete, anchor holes are formed in the substrate in order to provide a seat to receive an anchor for securely holding in place drill frames or other instruments to be used.

The most common fasteners for securing the instruments in the anchor hols are anchors that remain in the substrate after the instrument have been disconnected. Such expandable anchors may be inserted into the substrate when the substrate is still in a moldable form, as in the case of wet concrete, or may be inserted into the substrate when the substrate has hardened. The anchors are typically left in the substrate after they have served their fastening function, though they may be removed after use, with varying degrees of difficulty. If removed, the anchors may need to be reformed prior to repeat usage. The costs associated with inserting and removing such anchors, as well as the cost of the anchors themselves, may be substantial where the project in question requires a large number of such anchors.

U.S. Pat. No. 2,691,293 illustrates one contemporary anchor with a curved lower end which is intended to be embedded in place in the concrete when poured. The anchor provides an exposed portion which is threaded for attachment of the devices to be anchored. However, the anchor is not removeable or reusable.

Other contemporary anchors are not embedded in the concrete when poured, but rather later inserted into predrilled holes. The deterioration of the concrete surrounding the holes, however, causes substantial difficulties in maintaining a tight fit between the anchor and the concrete, sometimes causing the anchor to fail. Where the hole is exposed to water penetration, the effects of freezing and thawing often cause deterioration or crumbling of the surrounding concrete which detracts from the ability of anchors to hold the concrete. Moreover, such anchors, if left in the substrate, will often react with rain and result in undesirable rust lines bleeding from the anchor along the surface of the substrate.

In addition to damage from water or other external factors, the normal slow crumbling of the concrete may allow the anchor to rotate in the hole and ultimately result in failure of the anchor. Though some devices, such as that disclosed in U.S. Pat. No. 4,250,681 disclose techniques for maintaining an anchor within a preformed slot, such devices require the use of additional plugs placed in abutment with the anchor to maintain the anchor in place and require the drilling of angled holes in the concrete to receive the anchor.

From the foregoing, it can be seen that it is desirable to have a removeable anchor that may be readily placed into an anchor hole and adjusted to grip the hole firmly without the need for additional cooperating elements, and may be readily extracted from the hole upon completion of the drilling steps.

SUMMARY OF THE INVENTION

A resuable anchor is disclosed for securing a supporting base plate in place along the surface of a substrate to be drilled. The anchor comprises an anchor body having a first body portion engageable to the base plate and a second body portion extendable into the substrate to be drilled. The second body portion comprises first and second cylindrical sections. The first cylindrical section is disposed in axial alignment with the first body portion and the second cylindrical section is formed to vary between a first position in axial alignment with respect to the first body portion and a second position eccentric with respect to said first body portion. The first and second cylindrical sections are adapted to cooperatively engage the substrate when the second cylindrical section is disposed in the second position to maintain the anchor body in place with respect to the substrate.

The second cylindrical section comprises a shaft portion disposed in axial alignment with respect to the first body portion adn the sleeve rotatably disposed about the shaft portion. The sleeve is formed to have an eccentric bore therethrough such that the sleeve may be rotated with respect to the shaft portion to an eccentric position, for securing the anchor to the substrate, and to a concentric position for inserting and withdrawing the anchor from the substrate.

The first cylindrical section comprises a shaft portion disposed in axial alignment with respect to the first body portion and the sleeve rotatably disposed about the shaft portion. The third cylindrical section may also be provided and disposed in substantial alignment with the first cylindrical section, opposite the second cylindrical section. The third cylindrical section comprises a shaft portion disposed in axial alignment with respect to the first body portion and the sleeve rotatably disposed about the shaft portion. Each of the sleeves may be slotted to facilitate removal from the associated shaft portion.

DETAILED DESCRIPTION OF THE PRESENTLY PREFERRED EMBODIMENT

Figure 1:
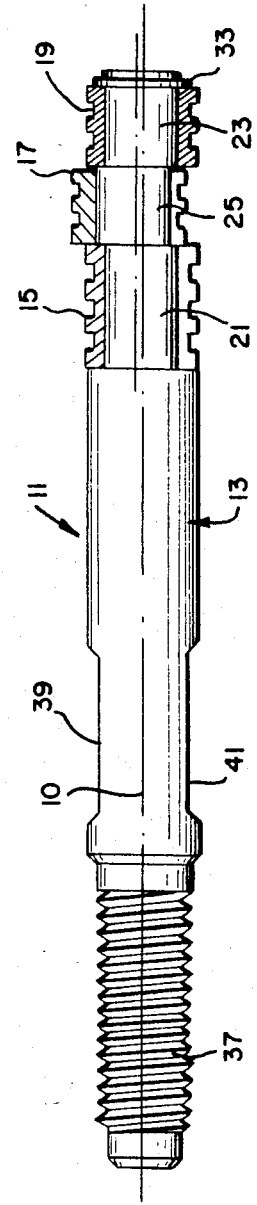
FIG. 1 is a front view of the reusable anchor in the locked position.

Referring now to the drawings wherein FIG. 1 is a front view of the presently preferred embodiment of the reusable anchor, showing the anchor in a locked position. Anchor 11 is shown as a substantially cylindrical device formed of anchor body 13 and rotatable collars 15, 17 and 19. Shaft body 13 comprises concentric shaft portions 21 and 23, and eccentric shaft portion 25.

Figure 3C:
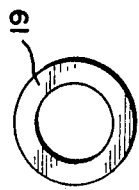
FIGS. 3(a), (b) and (c) are end views of the anchor shaft collars.
Figure 3B:
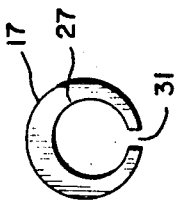

Collar 17 is preferably formed as shown at FIG. 3(b). Collar 17 is preferably formed to have an eccentric bore 27 therethrough. Collar 17 and eccentric shaft portion 25 thus cooperate to vary the extension of the outer surface of collar 17 from the shaft center line 10 as the shaft and the collar 17 rotate. When the wider portion of shaft portion 25 and the wider portion of the collar 17 areboth on the same side of the center line 10, the upper surface of collar 17 extends beyond the upper surface of collars 15 and 19, as shown at FIG. 1. However, when the wider portion of shaft portion 25 and the wider portion of collar 17 are on the different sides of center line 10, the outer surface of collar 17 is disposed in substantial alignment with the outer surfaces of adjustment collars 15 and 19.

Figure 2:
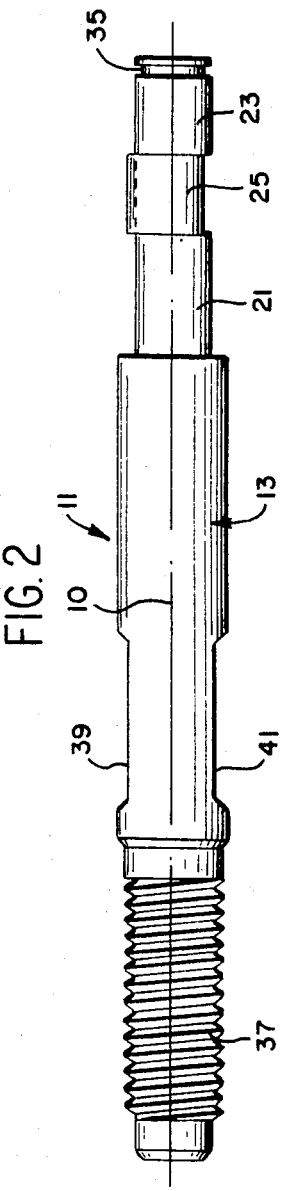
FIG. 2 is a front view of the reusable anchor without the shaft collars.
Figure 3A:
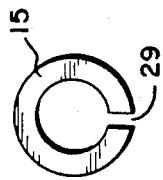

FIGS. 3(a), (b) and (c) illustrate exemplary constructions of the collars 15, 17 and 19. FIG. 3(a) illustrates concentric collar 15, which includes slot 29 to facilitate fitting the collar 15 about shaft portion 21. FIG. 3(b) illustrates eccentric collar 17, as previously described, including slot portion 31 which facilitates mounting the collar 17 about shaft portion 25. FIG. 3(c) illustrates concentric collar 19 which fits directly upon shaft portion 23 and is held in place by "O" ring connector 33, which fits in slot 35, illustrated at FIG. 2.

Shaft 11 is also preferably provided with threaded portion 37 which facilitates engagement of the anchor to a Base plate (not shown) used to support a drilling device or other machinery to be secured with respect to the substrate.

In practice, the invention operates as follows: A blind or through hole is drilled into the substrate sufficient to receive the reusable anchor 11, with shaft portion 25 and collar 17 being disposed in the concentric position such that the outer surface of collar 17 is in substantial alignment with the outer surface of collars 15 and 19. After the anchor 11 is disposed in the hole, the shaft body 13 is rotated, e.g., by means of a wrench of pliers, bearing against the surfaces 39 and 41 of shaft body 13. The shaft body is rotated such that eccentric shaft portion 25 and eccentric collar 17 cooperate to extend one surface of collar 17 further from center line 10 that are the outer surfaces of collars 15 or 19. Collar 17 thus engages an inner surface of the hole and, in conjunction with the surfaces of collars 15 and 19, press against the inside of the hole to hold anchor 11 in place. The degree to which the anchor is tightened within the hole depends upon the amount of eccentricity in collar 17 and shaft portion 25, and the degree to which the anchor body 13 is rotated. Once the anchor 11 is secured in place, a base plate supporting a drill frame, or other machinery, may be secured to the anchor body by engagement to threads 37 formed on a first end portion of the shaft body 11.

To remove the anchor the base plate and drill or other machinery are removed from connection to threads 37 and the anchor body 13 is rotated in the opposite direction to bring the outer surface of eccentric collar 17 into substantial alignment with the outer surfaces of collars 15 and 19. The anchor is then no longer in compressive engagement with the inner surfaces of the hole, and the anchor 11 may be readily removed.

In the presently preferred embodiment, the shaft portions 21, 23 and 25 are each formed with a diameter of approximately one-half (0.5) inches. The eccentric shaft portion 25 has a center line that is offset from center line 10 by approximately 0.05 inches. Collars 15, 17 and 19 are formed to have an inside diameter of slightly more than 0.5 inches, with an outside diameter of approximately 0.675 inches. Collars 15 and 19 are approximately 0.175 inches thick. Collar 17 has a bore of approximately 0.050 inches offset from the center line of the collar. Thus, eccentric collar 17 has a variable thickness extending from approximately 0.0375 inches to 0.1375 inches. The collars are preferably formed of stainless steel with a hardness level of ASTM 162. The shaft is preferably also formed of carbon or stainless steel with a hardness level of ASTM 17-4 PH, condition 1025.

It should be recognized by those of ordinary skill in the art that the above-referenced dimensions are merely exemplary and various other dimensions may be utilized so long as the described interrelationship of outside diameters of the shaft portions and collars are affected. It should also be recognized that the number of eccentric and concentric shaft portions may be modified in accordance with the desired application. Thus, those and other modifications may be implemented without departing from the spirit and scope of the invention as set forth in the appended claims.

What is claimed is:

1. A reusable anchor for securing a drill supporting base in place along a substrate to be drilled comprising a first body portion engageable to the base, a second body portion extendable into a bore formed within the substrate to be drilled, and first and second sleeves, said first sleeve having a concentric bore formed therethrough and rotatable about said second body portion to remain in place within the bore as said first body portion is rotated, said second sleeve having an eccentric bore formed therethrough and rotatable about said second body portion such that upon rotation of said first body portion said second sleeve is urged to an eccentric position with respect to said first sleeve to wedge the anchor in place with minimal rotational friction within the bore.

2. A reusable anchor for securing a drill supporting base in place along a substrate to be drilled comprising a first body portion engageable to the base, a second body portion extendable into a bore formed within the substrate to be drilled and first, second and third sleeves, said first and second and third sleeves having bores therethrough and rotatable about said second body portion such that upon rotation of said first body portion said second sleeve is urged to a position eccentric relative to said first and second sleeves to wedge the anchor in place with minimal rotational friction within the bore.

3. A reusable anchor for securing a drill supporting base in place along the surface of a substrate to be drilled comprising a first body portion engageable to the base and a second body portion extendable into the substrate to be drilled and having first, second and third sleeves, said first and third sleeves having concentric bores therethrough and rotatable about said second body portion, said second sleeve having an eccentric bore therethrough and rotatable about said second body portion such that upon rotation of said first body portion said second sleeve is rotated to an eccentric position with respect to said second body portion as said first and third sleeves remain substantially in place within the substrate.

4. The anchor as recited in claim 3 wherein the second sleeve is disposed intermediate said first and third sleeves.

5. The anchor as recited in claim 3 wherein said second body portion comprises concentric and eccentric segments, said first and third sleeves being rotatable about concentric segments and said second sleeve being rotatable about an eccentric segment.

6. The anchor as recited in claim 3 wherein said second sleeve is rotatable from a first position in alignment with said first and third sleeves, to a second position wherein said second sleeve extends beyond said first and third sleeves to secure said anchor in place within the base.

7. The anchor as recited in claim 3 wherein said first sleeve is rotatable about said second body portion to reduce rotational friction within said substrate as said first body portion is rotated.

8. The anchor as recited in claim 3 wherein said third sleeve is rotatable about said second body portion to reduce rotational friction within said substrate as said first body portion is rotated.

9. The anchor as recited in claim 3 wherein said first sleeve is sloted to facilitate removal from said second body portion.

10. The anchor as recited in claim 3 wherein said second sleeve is sloted to facilitate removal from said second body portion.

* * * * *